S. E. DENT.
COMPOUND TOOL.
APPLICATION FILED APR. 29, 1914.
1,140,128.
Patented May 18, 1915.
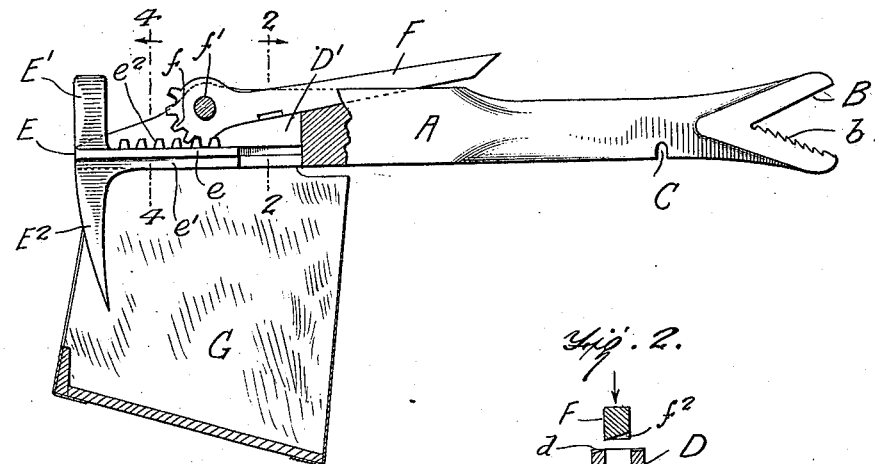
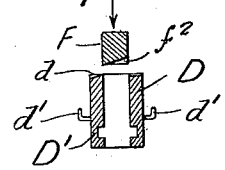
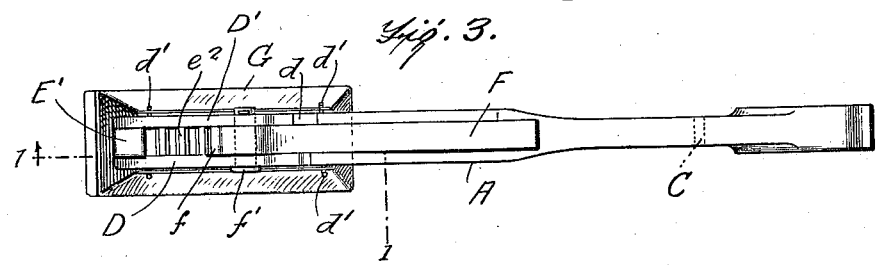
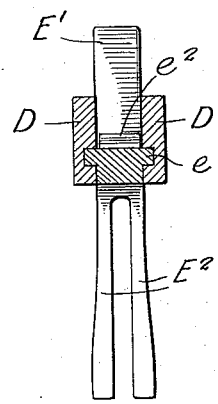
WITNESSES
INVENTOR
STROTHER E. DENT,
BY
ATTORNEYS

UNITED STATES PATENT OFFICE.

STROTHER E. DENT, OF LITTLE ROCK, ARKANSAS.

COMPOUND TOOL.

1,140,128. Specification of Letters Patent. Patented May 18, 1915.

Application filed April 29, 1914. Serial No. 835,155.

*To all whom it may concern:*

Be it known that I, STROTHER E. DENT, a citizen of the United States, and a resident of Little Rock, in the county of Pulaski and State of Arkansas, have made certain new and useful Improvements in Compound Tools, of which the following is a specification.

My present invention relates to compound tools and the object thereof is to provide a tool embodying various implements in connection with the setting up and repair of wire fences, my object in particular being to provide an implement of this character including novel and improved means for withdrawing fence wire staples in such a manner as to permit of their subsequent use.

In the accompanying drawing which illustrates my invention, Figure 1 is a view partly in side elevation and partly broken away and in section substantially on the line 1—1 of Fig. 3, Fig. 2 is a detail cross section taken substantially on the line 2—2 of Fig. 1, Fig. 3 is a plan view, and Fig. 4 is another transverse section taken substantially on the line 4—4 of Fig. 1.

Referring now to these figures, the tool or implement embodying my invention consists of a handle A provided at its rear end with a V-shaped cut-out portion B, one wall of which is serrated or toothed as indicated at $b$ whereby to form an integral wrench for the engagement and manipulation of nuts. Adjacent to this recessed end B of the handle, the latter is provided with a transverse recess C which may engage a fence wire in order to stretch the same when the tool is applied with its recessed end in engagement with a suitable support in order to provide a working fulcrum.

The opposite end of the handle A is bifurcated, its side portions D and D' resulting from such bifurcation being provided upon their inner opposing faces with grooves extending longitudinally thereof and forming guides to receive the side ribs $e$ of a suitable pulling member E movable between the side portions D and D' in the direction of the longitudinal axis of the handle.

This staple pulling member E consists of a shank $e'$ from the outer end of which a striking head E' projects laterally in one direction, and claws $E^2$ project laterally in the opposite direction. The upper surface of the shank $e'$ is provided with a rack $e^2$ in connection with which is a geared segment $f$ formed upon one end of a lever F and adjacent to which end the lever is fulcrumed upon a pin $f'$ extended through the spaced handle portions D and D' adjacent the rack $e^2$.

At a point adjacent to its fulcrum the lever F has its inner face beveled, as indicated at $f^2$ in Fig. 2, in order to provide a cutting edge coöperating with a similarly beveled portion $d$ at the upper edge of the handle portion D' whereby to form a wire cutter.

The side portions D and D' of the handle are also provided with outstanding hooks $d'$ adapted to receive the upper side portions of a suitable receiving bag G which, in its operative position as shown in Fig. 1, depends below the bifurcated end of the handle A to receive the staples as they are removed by the staple pulling member E.

In pulling a staple one or both of the claws $E^2$ may be forced beneath the staple by blows delivered against the head E' through the use of a hammer or other suitable implement, with the lever F against the handle in the position shown in Fig. 1. Thus outward movement of the lever, through its geared engagement with the rack $e^2$, causes inward movement of the staple pulling member whereby to withdraw the staple in a substantially straight line into the bag G wherein it drops when wholly freed. It is to be particularly noted in this operation that the withdrawal of the staple in a straight line obviates all danger of bending or otherwise destroying the same and permits of its subsequent use. A great saving is thus effected.

The use of the tool as a wrench, wire stretcher, and wire cutter may be readily understood from the foregoing.

I claim:

1. An implement of the character described, comprising a hammer head, a handle longitudinally slotted at one end to provide spaced side portions between which the head is movable, the outer extremities of which side portions are adapted to engage a suitable support when the head is moved inwardly between the said side portions so as to operate both as a stationary abutment and a fulcrum upon which the handle with its head may be moved, and means for forcibly moving the head in the slot longitudinally of the handle, all substantially as and for the purpose set forth.

2. An implement of the character described, comprising a hammer head, a handle longitudinally slotted at one end to provide spaced side portions between which the head is movable, the outer extremities of which side portions are adapted to engage a suitable support when the head is moved inwardly between the said side portions so as to operate both as a stationary abutment and a fulcrum upon which the handle with its head may be moved, and means for forcibly moving the head in the slot longitudinally of the handle, said means comprising a lever fulcrumed on the handle and engaging a portion of the hammer head, all substantially as and for the purpose set forth.

STROTHER E. DENT.

Witnesses:
A. J. WILSON,
R. B. GREEN.